United States Patent
Matsui et al.

(10) Patent No.: US 11,099,042 B2
(45) Date of Patent: Aug. 24, 2021

(54) CLAMP-ON ULTRASONIC FLOWMETER DETERMINING FLOW RATE CORRESPONDING TO PHASE VELOCITY OF LOW ORDER ASYMMETRIC MODE FROM PLATE WAVE GENERATION

(71) Applicant: Keyence Corporation, Osaka (JP)

(72) Inventors: Hiroki Matsui, Osaka (JP); Masaki Wada, Osaka (JP)

(73) Assignee: Keyence Corporation, Osaka (JP)

( * ) Notice: Subject to any disclaimer, the term of this patent is extended or adjusted under 35 U.S.C. 154(b) by 156 days.

(21) Appl. No.: 16/574,174

(22) Filed: Sep. 18, 2019

(65) Prior Publication Data

US 2020/0209028 A1 Jul. 2, 2020

(30) Foreign Application Priority Data

Dec. 28, 2018 (JP) .............................. JP2018-248710

(51) Int. Cl.
*G01F 1/66* (2006.01)
*G01F 1/00* (2006.01)

(52) U.S. Cl.
CPC .............. *G01F 1/662* (2013.01); *G01F 1/667* (2013.01); *G01F 1/002* (2013.01)

(58) Field of Classification Search
None
See application file for complete search history.

(56) References Cited

U.S. PATENT DOCUMENTS

| | | | | |
|---|---|---|---|---|
| 6,047,602 A | * | 4/2000 | Lynnworth | G01F 1/662 73/632 |
| 6,575,043 B1 | * | 6/2003 | Huang | G01F 1/002 73/861.18 |
| 2005/0055171 A1 | * | 3/2005 | Freund, Jr. | G01F 1/72 702/89 |
| 2009/0016555 A1 | * | 1/2009 | Lynnworth | G01F 1/662 381/338 |
| 2019/0285449 A1 | | 9/2019 | Niimura | |
| 2019/0285450 A1 | | 9/2019 | Tsukigi et al. | |
| 2020/0056917 A1 | * | 2/2020 | Firouzi | G01N 29/024 |

FOREIGN PATENT DOCUMENTS

| | | |
|---|---|---|
| JP | S6238355 A | 2/1987 |
| JP | 2018077079 A | 5/2018 |
| JP | 2018119878 A | 8/2018 |

OTHER PUBLICATIONS

U.S. Appl. No. 16/568,290, filed Sep. 12, 2019 (58 pages).

* cited by examiner

*Primary Examiner* — Harshad R Patel
(74) *Attorney, Agent, or Firm* — Kilyk & Bowersox, PLLC

(57) ABSTRACT

A clamp-on type ultrasonic flowmeter which is detachably attached to an outer wall of cylindrical piping is provided. An ultrasonic signal is transmitted to the piping from one of the first and the second ultrasonic devices, a plate wave corresponding to the ultrasonic signal is generated, and an ultrasonic signal corresponding to the plate wave is received by the other ultrasonic device. A pipe wall thickness of the piping and a frequency of the ultrasonic signal are in a state in which a plate wave of a low order asymmetric mode is significantly excited in the piping. A flow rate is calculated corresponding to phase velocity characteristics of the low order asymmetric mode.

11 Claims, 9 Drawing Sheets

SYMMETRIC MODE S0

ASYMMETRIC MODE A0

Cp: PIPE WALL SONIC VELOCITY
(PIPE WALL PHASE VELOCITY)
Cf: FLUID SONIC VELOCITY
θf: IN-FLUID ANGLE

CLAMP-ON ULTRASONIC FLOWMETER DETERMINING FLOW RATE CORRESPONDING TO PHASE VELOCITY OF LOW ORDER ASYMMETRIC MODE FROM PLATE WAVE GENERATION

CROSS-REFERENCE TO RELATED APPLICATIONS

The present application claims foreign priority based on Japanese Patent Application No. 2018-248710, filed Dec. 28, 2018, the contents of which is incorporated herein by reference.

BACKGROUND OF THE INVENTION

1. Field of the Invention

The present invention relates to a flowmeter which generally measures a flow rate of a gas flowing in piping using an ultrasonic wave. The invention is suitably applied to a clamp-on type gas flowmeter which takes a gas as a measurement object and is installed post-fitting on piping.

2. Description of Related Art

There has been known a measuring instrument using an ultrasonic wave to measure a flow velocity and a flow rate of a liquid or a gas flowing in piping. This kind of measuring instrument is called an "ultrasonic flowmeter".

A principle of the ultrasonic flowmeter basically utilizes, with respect to a fluid (fluid to be measured) flowing in piping, a time difference between an outward path propagation time for propagating in a flowing direction of the fluid and a return path propagation time for propagating in a direction opposite to the flowing direction of the fluid. The ultrasonic flowmeter measures the flow rate of the fluid based on the time difference.

An example of a method of detecting a "time difference" in the ultrasonic flowmeter will be described. First, a burst ultrasonic signal is intermittently emitted, and a received waveform thereof is A/D converted to be sampled at a high speed. Here, a burst ultrasonic signal is a signal where ultrasonic pulses of hundreds of kHz to several MHz, for example, ten times of pulses become a lump. An outward path reception waveform and a return path reception waveform are aligned respectively taking a time point at which they are emitted as an origin, and waveform shape matching is performed while displacing relatively in a time direction from the aligned state. A time shift amount in which the matching degree reaches maximum is determined as a propagation time difference and the flow rate is calculated based on the propagation time difference.

As an ultrasonic flowmeter, there has been known an ultrasonic flowmeter which is installed on piping in a post-fitting mode. The post-fitting ultrasonic flowmeter is called a "clamp-on type flowmeter" (JP-A-2018-77079, JP-A-2018-119878).

As disclosed in JP-A-2018-119878, there have been known a "V-shape arrangement" and a "Z-shape arrangement" with respect to an arrangement of a first ultrasonic device and a second ultrasonic device included in an ultrasonic flowmeter. The "V-shape arrangement" means that the first ultrasonic device and the second ultrasonic device are respectively arranged on a first mother line of piping at a first position and a second position apart from each other in an axial direction of the piping. The "Z-shape arrangement" means that the first ultrasonic device is arranged on the first mother line of the piping, the second ultrasonic device is arranged on a second mother line which opposes the first mother line in a diameter direction, and the first ultrasonic device and the second ultrasonic device are positioned apart from each other in the axial direction of the piping.

The clamp-on type ultrasonic flowmeter has a problem that a transmission loss of ultrasonic signals occurs as the ultrasonic signals cross the wall of the piping. That is, the piping and a fluid to be measured differ in acoustic impedance. When the acoustic impedance value differs greatly, a transmission loss occurs due to a reflection at an interface between the piping and the fluid. When a liquid and a gas are compared, the acoustic impedance of the gas is much smaller than the acoustic impedance of the liquid, and thus the difference in acoustic impedance between the piping and the gas becomes extremely large. As a result, there is a problem that, when a gas is to be measured, most of ultrasonic waves are reflected at the interface between the piping and the gas and the signal intensity cannot be increased. This means that it is extremely difficult to measure the flow rate of a gas.

In an ultrasonic flowmeter taking a gas as a measurement object, a method of generating a plate wave propagating in a direction parallel to the axis of the piping using the piping material as a medium and vibrating the piping by the plate wave (JP-A-62-038355) is proposed. There is an advantage that the intensity of the ultrasonic signals propagating in the gas to be measured can be increased by utilizing the inherent vibration phenomenon of the piping due to the plate wave.

SUMMARY OF THE INVENTION

To examine behaviors of ultrasonic signals, an ultrasonic signal proceeds while being reflected or being refracted according to Snell's law at an interface between materials with different sonic velocities of ultrasonic waves.

Further, when an ultrasonic signal of a longitudinal wave (P wave) is irradiated from an ultrasonic wave generation source, a transverse wave (S wave) is also generated besides the longitudinal wave (P wave) by a mode conversion at the interface. Since the sonic velocity of the transverse wave (S wave) is lower than the sonic velocity of the longitudinal wave (P wave), the longitudinal wave (P wave) and the transverse wave (S wave) are refracted at different angles at the interface and the ultrasonic signal proceeds in a member (material) on a side receiving the longitudinal wave and the transverse wave.

When an ultrasonic signal of a longitudinal wave (P wave) is irradiated to a member having two opposing interfaces, such as a flat plate and a pipe wall of a circular pipe, an ultrasonic signal in a vibration mode different from a longitudinal wave (P wave) and a transverse wave (S wave) proceeding in a material is generated due to irradiation conditions.

There is known a plate wave (Lamb wave) proceeding in parallel with respect to interfaces of a parallel plate, and there are a symmetric mode SO in which the opposing interfaces vibrate symmetrically and an asymmetric mode AO in which the opposing interfaces vibrate asymmetrically.

The pipe wall of the circular pipe can be regarded as a cylindrical round plate. As long as the pipe wall is not extremely thick with respect to the pipe diameter (as long as the inner diameter is not extremely small), a plate wave (two-interface wave: vibration mode wave generated in a plate-shaped member) similar to the Lamb wave is generated and this is defined as a plate wave in a broad sense or a Lamb wave in a broad sense in the present specification.

The Lamb wave (plate wave) in the broad sense is a vibration mode depending on the frequency of the ultrasonic signal and the thickness of the plate (pipe wall), and a phase velocity thereof has a property that the phase velocity is determined by the frequency of the ultrasonic signal and the thickness of the plate (pipe wall). This relation differs depending on the material of the plate (pipe wall).

FIG. 1 shows a characteristic curve indicating a relation between frequency·thickness (f·d) and phase velocity for each mode of the symmetric mode S0 and the asymmetric mode A0 of a Lamb wave in SUS piping. In FIG. 1, the horizontal axis represents f·d value (MHz·mm) and the vertical axis represents phase velocity (m/s).

The ultrasonic signal is obliquely incident on the piping from the ultrasonic wave generation source (ultrasonic wave generation device) via a wedge member and is then incident from the piping to a fluid to be measured. Since a normal ultrasonic signal follows Snell's law, an in-fluid angle can be determined when a sonic velocity of an ultrasonic wave propagating in the wedge member, the incident angle from the wedge member to the piping, and a sonic velocity of an ultrasonic wave propagating in the fluid to be measured are determined. Therefore, a normal ultrasonic signal does not depend on the sonic velocity of an ultrasonic wave propagating in the piping. As a result, when a vibration mode such as a Lamb wave is not used, that is, when a normal ultrasonic signal is used, the flow rate can be measured without relying on the sonic velocity of the ultrasonic wave propagating in the piping.

On the other hand, in a case of the vibration mode such as a Lamb wave, an ultrasonic signal having an in-pipe-wall angle of 90° (parallel to pipe wall surface) is generated at a phase velocity determined by the frequency of the ultrasonic signal and the thickness of the plate (pipe wall) as described above from ultrasonic signals supplied to the piping from the wedge member. That is, Snell's law is not always followed between the wedge member and the piping. More specifically, a forced vibration wave having an in-pipe-wall angle of 90° is generated at a phase velocity according to Snell's law by ultrasonic signals supplied from the wedge member, and thus a vibration mode close to the phase velocity of the forced vibration wave is more strongly excited.

Conventionally, a basic guideline in the design of a flowmeter utilizing the vibration mode such as a Lamb wave has been using a region having a substantially constant phase velocity without being influenced by the piping thickness and the frequency of the ultrasonic signal. Referring to FIG. 1 as an example, the region having this substantially constant phase velocity corresponds to a region in which the f·d value is about 5 or more (Ar1 in FIG. 1). In this region, the phase velocity is about 3000 m/s. By following the conventional design guideline, it is possible to obtain a signal intensity capable of obtaining a flow rate of a gas to be measured, and it is also possible to obtain the flow rate of the gas to be measured by calculating using the same method as in the case of a normal ultrasonic signal.

However, the region Ar1 having a substantially constant phase velocity regardless of the piping thickness and the frequency of the ultrasonic signal is also a region where the phase velocities of a plurality of vibration modes are close to each other. That is, in the region Ar1, a plurality of vibration modes are excited in a form of having significant signal intensity. As a result, the plurality of mixed vibration modes hinder a high accuracy flow rate measurement (propagation time difference measurement). With regard to this problem, in order to extract a desired vibration mode from the plurality of mixed vibration modes, a method of utilizing a velocity difference between the vibration modes and separating the first and the second ultrasonic devices in the axial direction of the piping, for example, by tens of centimeters, has been employed.

During a development of a clamp-on type ultrasonic flowmeter which can be effectively applied to metal piping and a gas which are the most difficult to measure, and can be installed even by a non-expert, the present inventors have proposed the invention as a result of reviewing the design guideline from a viewpoint that the flowmeter would become too large when following the conventional design guideline in order to increase the accuracy of the flow rate measurement.

An object of the invention is to provide a clamp-on type ultrasonic flowmeter which can maintain flow rate measurement accuracy at a high level even if a first ultrasonic device and a second ultrasonic device are arranged close to each other in an axial direction of piping.

In order to achieve the object, the invention provides a clamp-on type ultrasonic flowmeter which is detachably attached to an outer wall of cylindrical piping and measures a flow rate of a gas flowing in the piping, wherein the clamp-on type ultrasonic flowmeter includes an ultrasonic transmitting and receiving section which has a first ultrasonic device and a second ultrasonic device, transmits an ultrasonic signal to the piping from one of the first and second ultrasonic devices, generates a plate wave corresponding to the ultrasonic signal, and receives an ultrasonic signal corresponding to the plate wave by the other ultrasonic device, and a flow rate calculating section which calculates a flow rate of a gas flowing in the piping based on the ultrasonic signal received by the ultrasonic transmitting and receiving section;

a pipe wall thickness of the piping and a frequency of the ultrasonic signal are in a state in which a plate wave of a low order asymmetric mode is significantly excited in the piping; and the flow rate calculating section calculates the flow rate of the gas corresponding to phase velocity characteristics of the low order asymmetric mode.

The invention has a characteristic of using a vibration mode of the lowest order asymmetric mode A0 among Lamb waves generated in a cylindrical pipe included in the piping in which a gas flows. In ultrasonic vibration, there are, in addition to a longitudinal wave (P wave) and a transverse wave (S wave) proceeding in a medium, a surface wave (one-interface wave) proceeding parallel to a surface of an object and a plate wave (two-interface wave) proceeding parallel to interfaces of a plate-shaped member having opposing interfaces. Phase velocities of the longitudinal wave (P wave), the transverse wave (S wave), the surface wave (one-interface wave), and the plate wave (two-interface wave) are different, and further, the plate wave (two-interface wave) has a phase velocity depending on the distance between the opposing interfaces and the frequency of the ultrasonic vibration. Generally the sonic velocity of the longitudinal wave is higher than the sonic velocity of the transverse wave (S wave) and the sonic velocity of the transverse wave (S wave) is slightly higher than the sonic velocity of the surface wave (one-interface wave). The plate wave (two-interface wave) has various phase velocities depending on the vibration mode, the ultrasonic frequency, and the distance between the interfaces.

The ultrasonic flowmeter makes an ultrasonic signal incident from outside the piping to a gas to be measured, measures, for example, propagation time difference of the ultrasonic signal, etc., and obtains a flow rate of a fluid to be measured from the measured propagation time difference, etc. FIG. 2 is a diagram for explaining waves generated due to the difference in an incident angle θ of ultrasonic waves. FIG. 3 shows relative signal intensity of each wave of the longitudinal wave L, the transverse wave S, and the surface wave R generated due to the difference of the incident angle θ.

Referring to FIG. 2A and FIG. 3, a longitudinal wave L is irradiated from an ultrasonic device and is incident at an incident angle θ inclined with respect to a vertical line of a piping wall 4 via a wedge member 2. In this case, the longitudinal wave L proceeds at an in-piping-wall angle corresponding to a sonic velocity of the longitudinal wave L in the wedge member and a sonic velocity of the longitudinal wave L in the piping. At this time, a transverse wave S is also generated in addition to the longitudinal wave L at the interface, and the transverse wave S proceeds at an in-piping-wall angle corresponding to the sonic velocity of the longitudinal wave L in the wedge member and a sonic velocity of the transverse wave S in the piping. Referring to FIG. 2B and FIG. 3, when the incident angle θ with respect to the piping wall 4 is increased, the longitudinal wave L is totally reflected and only the transverse wave S proceeds in the piping wall 4. Referring to FIG. 2C and FIG. 3, when the incident angle θ with respect to the piping wall 4 is further increased, the transverse wave S is also totally reflected and there are no longitudinal wave L and transverse wave S proceeding inside the piping wall. When the piping wall 4 is regarded as one interface, that is, when the thickness of the piping wall is sufficiently thick, a surface wave R having a sonic velocity slightly lower than that of the transverse wave S is generated as the incident angle θ with respect to the piping wall 4 is increased.

When the thickness of the piping wall 4 is 18% or less, or at least 14% or less with respect to an outer diameter of the piping, a plate wave (two-interface wave) having characteristics approximated to a Lamb wave in a flat plate is observed. As to the application of the invention, it is preferable that the invention is applied to piping where the outer diameter of the piping is about 18 mm to 250 mm and the thickness of the piping wall 4 is about 2 mm to 15 mm. Even in this case, it is preferable to select piping where the thickness of the piping wall 4 is 18% or less, preferably at least 14% or less with respect to the outer diameter of the piping. The material of the piping to which the gas flowmeter of the invention is applied is preferably metal, for example, carbon steel, SUS, aluminum alloy, etc. can be selected. In other words, the gas flowmeter of the invention can be suitably applied to metal piping, and to be specific, can be applied to piping made with, for example, carbon steel, SUS, or aluminum alloy.

Referring to FIG. 4, among Lamb waves generated in the cylindrical pipe, the vibration mode of the lowest order asymmetric mode AO (FIG. 4B) and the vibration mode of the lowest order symmetric mode SO (FIG. 4A) have a characteristic that the greater the value of a product of a frequency of an ultrasonic wave and the pipe wall thickness (f·d), the closer to the sonic velocity of the surface wave R. The asymmetric mode AO (FIG. 4B) is further lower than the sonic velocity of the surface wave R, and thus by further increasing the incident angle θ with respect to the piping wall 4, the vibration mode of the lowest order asymmetric mode AO can be more selectively excited significantly. By selecting a region of the product of a frequency of an ultrasonic wave and the pipe wall thickness (f·d) where a ratio of phase velocities of each vibration mode is large with respect to the product of a frequency of an ultrasonic wave and the pipe wall thickness (f·d), it is easy to uniquely set a vibration mode which is significantly excited. Even if the distance between a pair of ultrasonic devices in the axial direction of the piping is set to a small value less than 10 cm, for example, it is possible to easily prevent the mixing of signals of a plurality of vibration modes.

The flow rate of a gas flowing in the piping may be calculated corresponding to phase velocity characteristics of the low order asymmetric mode. An example of operational expressions for obtaining the flow rate of a gas will be described below.

Flow rate=mean flow velocity×cross-sectional area

Here, the mean flow velocity can be obtained based on the following expression.

Mean flow velocity=flow velocity correction factor× measuring flow velocity $V$

Further, the cross-sectional area can be obtained based on the following expression.

Cross-sectional area=(inner diameter $D$/2)×(inner diameter $D$/2)×π(ratio of the circumference of a circle to its diameter)

The above inner diameter means the inner diameter of the piping.

Therefore, the flow rate can be obtained based on the following expression.

Flow rate=flow velocity correction factor×measuring flow velocity $V$×(inner diameter $D$/2)×(inner diameter $D$/2)×π

Here, the measuring flow velocity V of the gas flowing in the piping can be obtained from the following general formula (in a case of reflection type (one time reflection)).

$$V = \frac{c_f}{2(2D)\tan\theta_f}\Delta t \qquad \text{[Math. 1]}$$

The Cf and the like will be described below with reference to FIG. 5. In FIG. 5, a reference numeral 4 denotes a pipe wall of piping in which a gas to be measured flows, and V denotes the measuring flow velocity of the gas. In addition, D denotes an inner diameter of the piping 4.

In the above formula, Cf denotes a sonic velocity of an ultrasonic wave (sonic velocity of a longitudinal wave) propagating in the gas to be measured. The θf denotes an emitted angle of the ultrasonic wave from the pipe wall to the gas to be measured. As to be described later with reference to FIG. 6, the θf is uniquely determined by Snell's law from a phase velocity Cp of a plate wave propagating in the pipe wall and a sonic velocity Cf of an ultrasonic wave propagating in the gas to be measured. Δt is propagation time difference and is measured by a detected ultrasonic signal.

Referring to FIG. 6, the following expressions are true when following Snell's law in relation to the phase velocity in the asymmetric mode AO.

$Cf/\sin \theta f = Cp/\sin 90°$

Therefore, $\theta f = \sin^{-1} Cf/Cp$

For the inner diameter D of the piping, an inner diameter designated by a user may be used. In addition, it is also possible to let the user designate an outer diameter of the piping and use an inner diameter that can be estimated from the outer diameter input by the user. For example, it is possible to let the user designate a piping standard and then estimate the inner diameter from the designated piping standard and an outer shape. Further, for the inner diameter D, it is possible to let the user designate the outer diameter of the piping and the thickness of the pipe wall and then obtain the inner diameter from the outer diameter and the thickness of the pipe wall input by the user.

The sonic velocity Cf of the ultrasonic wave propagating in a fluid and the in-fluid angle θf are obtained by a user's designation, a previous storage, another measurement, calculation, etc., and a propagation time difference can be measured by a measurement by an ultrasonic device. In this way, the measuring flow velocity V of the gas can be obtained. As described above, the flow rate of the gas flowing in the piping is obtained by the predetermined flow velocity correction factor, the cross-sectional area obtained by the user setting, and the above obtained measuring flow velocity V. Therefore, the flow rate of the gas flowing in the piping can be obtained using a dependence relation with the phase velocity Cp of the plate wave propagating in the pipe wall.

Effects and other objects of the invention will become apparent from a description of preferred embodiments of the invention with reference to the drawings.

BRIEF DESCRIPTION OF THE DRAWINGS

FIG. 2A shows a case where the incident angle θ is comparatively small, FIG. 2B shows a case where the incident angle is comparatively large, and FIG. 2C shows a case where the incident angle is larger;

DESCRIPTION OF EMBODIMENTS

Embodiments

Figure 7:
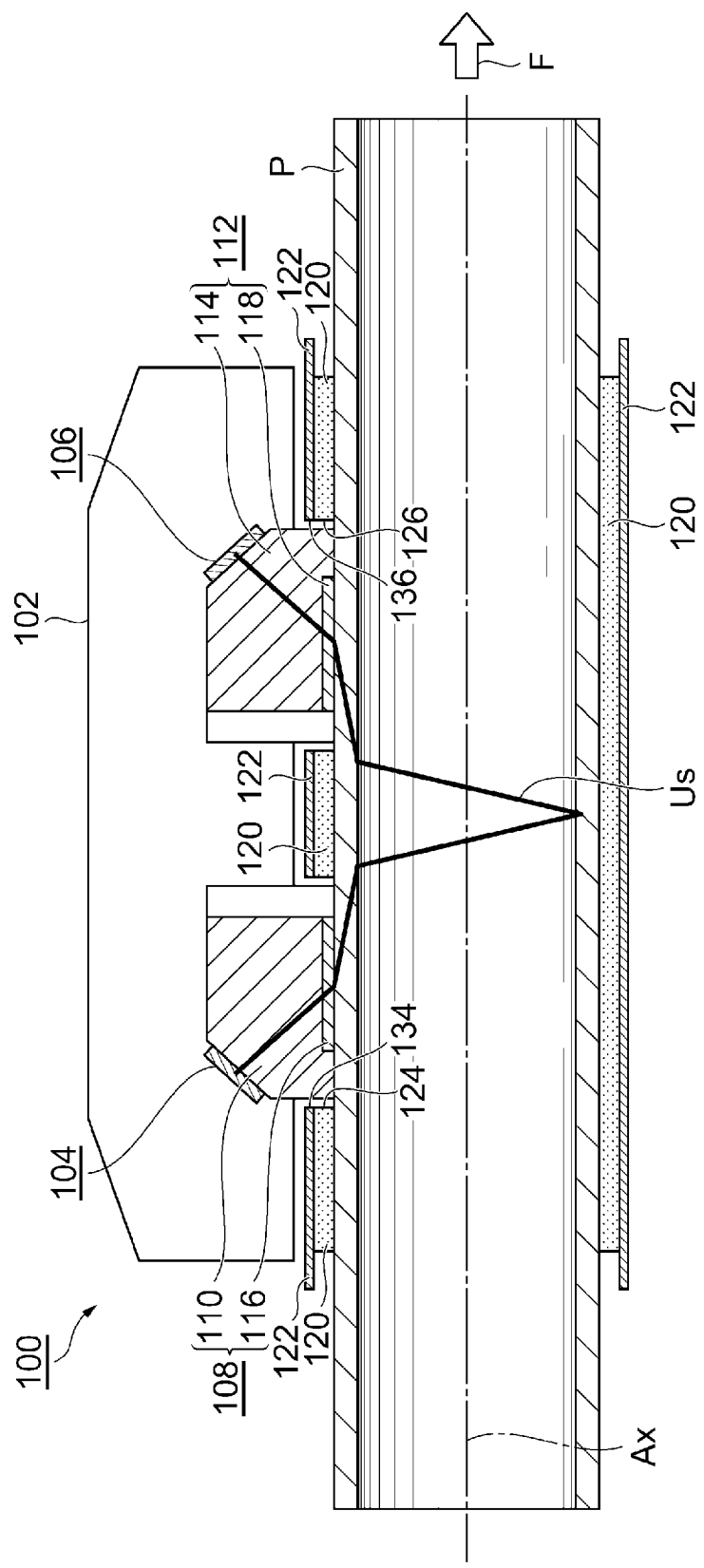
FIG. 7 is a schematic cross-sectional view of a flowmeter of an embodiment.

Embodiments of the invention will be described below with reference to FIG. 7 to FIG. 9. FIG. 7 is a cross-sectional view of a clamp-on type ultrasonic flowmeter 100 to which the invention is applied. The flowmeter 100 of the embodiment is not particularly limited. However, the flowmeter 100 is designed to be suitably applied to flow rate measurement of compressed air and nitrogen gas. Taking the compressed air as an example, with respect to operating apparatus which uses compressed air as an operating source in a factory, the flowmeter 100 is installed post-fitting on piping P which supplies air compressed by a compressor to each operating apparatus from a tank storing the compressed air.

The flowmeter 100 has a flow sensor body 102 installed in piping P. The flow sensor body 102 incorporates a first ultrasonic device 104 and a second ultrasonic device 106 which transmit and receive an ultrasonic wave. That is, the first ultrasonic device 104 and the second ultrasonic device 106 are integrated in the common flow sensor body 102. The first ultrasonic device 104 and the second ultrasonic device 106 typically include a piezoelectric device.

In the clamp-on type ultrasonic flowmeter 100, the first ultrasonic device 104 and the second ultrasonic device 106 are arranged on a mother line of the piping P apart from each other in a direction of an axis Ax of the piping P. That is, the flowmeter 100 is a so-called clamp-on type flowmeter of a V-shape arrangement or a reflection arrangement. In the drawing, reference sign Us schematically represents a path of an ultrasonic signal transmitted and received between the first ultrasonic device 104 and the second ultrasonic device 106. The flowmeter 100 generates a plate wave, that is, a natural vibration mode of the piping wall in the pipe wall of the piping P as described above, and thus it is to be understood that the path Us shown in the drawing is schematically illustrated.

The flow sensor body 102 includes a first wedge member 110 as a first ultrasonic transmitting section 108 adjacent to the first ultrasonic device 104, and a second wedge member 114 as a second ultrasonic transmitting section 112 adjacent to the second ultrasonic device 106. Further, the flow sensor body 102 preferably includes a first couplant 116 adjacent to the first wedge member 110 and a second couplant 118 adjacent to the second wedge member 114, and the first and second couplants 116 and 118 constitute part of the first and second ultrasonic transmitting sections 108 and 112 and are also included in a contact section to contact with the piping P. In order to improve installation workability, it is preferable that the first and second couplants 116 and 118 are formed with a solid couplant.

In the drawing, reference numeral 120 denotes a damping member. The damping member 120 has moderate flexibility and preferably is a sheet-shaped molded article having a predetermined thickness. It is preferable that the damping member 120 has viscoelasticity and has adhesion and peelability to the metal piping P. The damping member 120 can be easily deformed along the periphery of the piping P by manually rubbing by an operator.

To be specific, the damping member 120 is typically formed with a molded article formed in a sheet shape having a uniform thickness. The damping member 120 is made with a cross-linked rubber, for example, a butyl rubber (isobutylene-isoprene rubber (IIR)), ethylene (ethylene-propylene rubber (EPDM)), nitrile rubber (NBR) (acrylonitrile-butadiene rubber (BR)), fluororubber (FKM), epichlorohydrin rubber (ECO), norbornene rubber (NOR), etc., as its main body.

In the damping member 120, the viscoelasticity is related to damping effect, and basically, the greater the value of loss tangent, the higher the damping performance. Therefore, it is better that the loss tangent of the damping member 120 is 0.5 or more, preferably 1.0 or more.

The damping member 120 is arranged adjacent to the flow sensor body 102 and is arranged so as to surround the piping P while being in contact with the piping P. The damping member 120 is fixed to the piping P by a damping fixture 122 surrounding the outer periphery of the damping member 120, and the damping member 120 is pressed against the piping P by the damping fixture 122. That is, the damping fixture 122 continues maintaining a pressure maintaining function against the damping member 120.

The piping P shown in the drawing is specifically, for example, metal piping having an outer diameter of about 25 mm to about 230 mm (typically iron or stainless steel piping).

The first and second ultrasonic devices 104 and 106 incorporated in the flow sensor body 102 are fixedly set in the direction of the axis Ax of the piping at a distance of, for example, 1 to 15 cm, preferably 2 to 6 cm. It is preferable to provide a plurality of forms having different distances and to make it possible to select a flowmeter 100 in a form corresponding to the outer diameter of the piping P or the pipe wall thickness of the piping P assembled by the user.

As an initial setting of the flowmeter 100, it is preferable to include a plurality of piping diameters which can be selected by the user. By incorporating operational expressions which utilize pipe wall thickness d and/or inner diameter D based on a piping standard and standards of various countries corresponding to the plurality of piping diameters provided as options, the flow rate of the gas can be calculated and displayed by computing from the piping diameter selected by the user.

The damping member 120 and the damping fixture 122 have hollow first and second damping windows 124 and 126. The first and second damping windows 124 and 126 are positioned at positions corresponding to the first and second couplants 116 and 118, and in this way, an inherent guide wave (Lamb wave in the broad sense) of the piping P can be generated.

In the piping P where the user installs the flowmeter 100, the flowmeter 100 is preferably designed such that a Lamb wave of the A0 mode from the A0 mode and the S0 mode is preferentially generated.

Figure 4A:
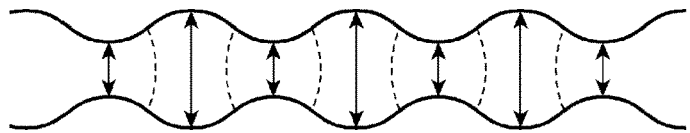
FIGS. 4A and 4B are diagrams for explaining vibration modes of the lowest order asymmetric mode AO and the lowest order symmetric mode SO among Lamb waves generated in a cylindrical pipe.
Figure 4B:
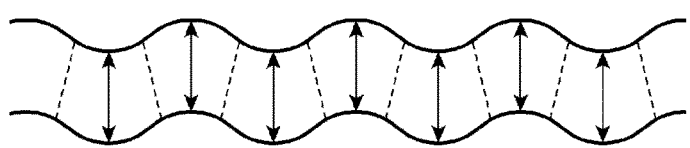
Figure 5:
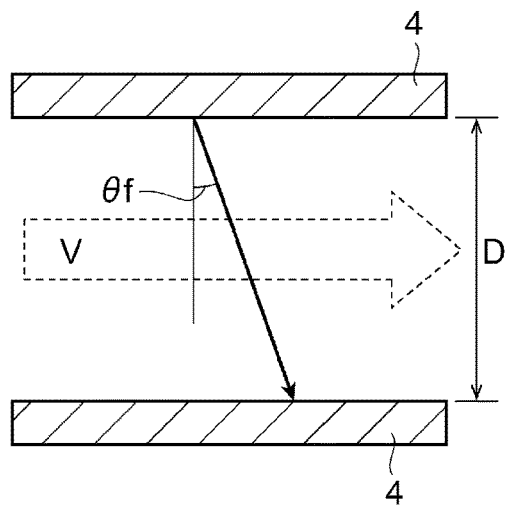
FIG. 5 is a diagram for explaining parameters related to measuring flow velocity V of a gas flowing in piping.
Figure 6:
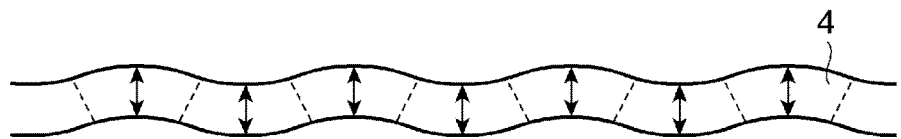
FIG. 6 is a diagram for explaining that an angle θf of an ultrasonic wave in a gas is uniquely determined by Snell's law from a phase velocity of a plate wave propagating in a pipe wall and a sonic velocity of an ultrasonic wave propagating in the gas.
Figure 6:
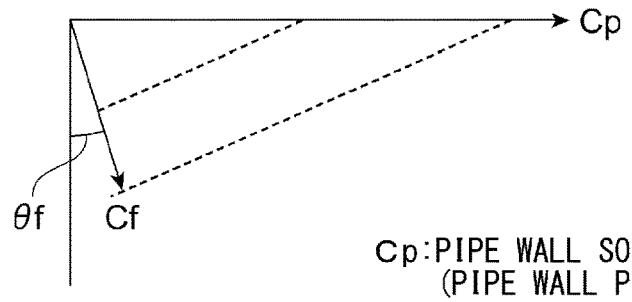

The vibration of the Lamb wave becomes more complex when the vibration mode becomes a higher order. A mode having the simplest vibration is the A0 mode, and the vibrations of an outer wall and an inner wall of the pipe wall P are asymmetric with respect to the pipe wall center (FIG. 4B). The next simple vibration mode is the S0 mode and in the S0 mode, the vibrations outside and inside the pipe wall P are symmetric with respect to the pipe wall center (FIG. 4A).

When the product of the pipe wall thickness of the piping P and the ultrasound frequency (f·d value) is equal to or less than a predetermined value (region Ar2 in FIG. 1), only the asymmetric mode A0 mode is excited, and even when the product of the pipe wall thickness of the piping and the ultrasound frequency is in a region slightly larger than Ar2 (region Ar3 in FIG. 1), the A0 mode is significantly excited as compared with the symmetric mode S0 mode and other modes due to the relation between the incident angle of the ultrasonic wave and the phase velocity.

Figure 1:
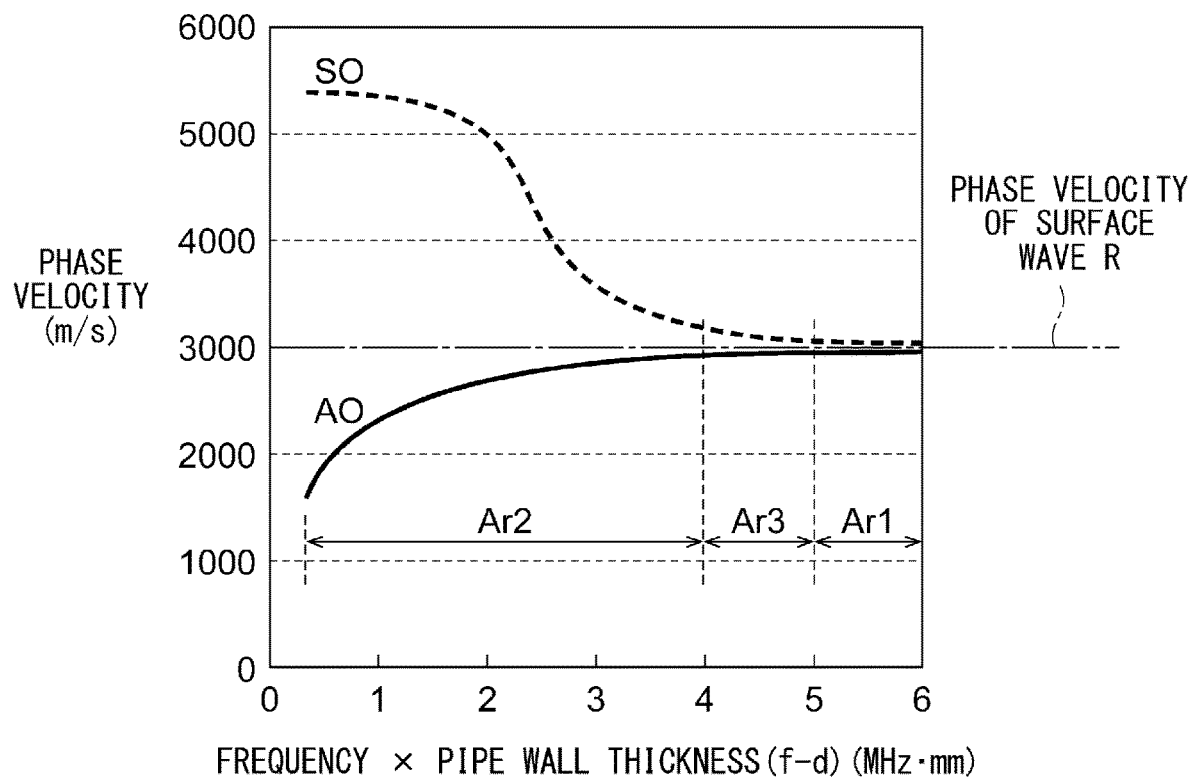
FIG. 1 shows a characteristic curve indicating a relation between frequency·thickness (f·d) and phase velocity in SUS piping.
Figure 2A:
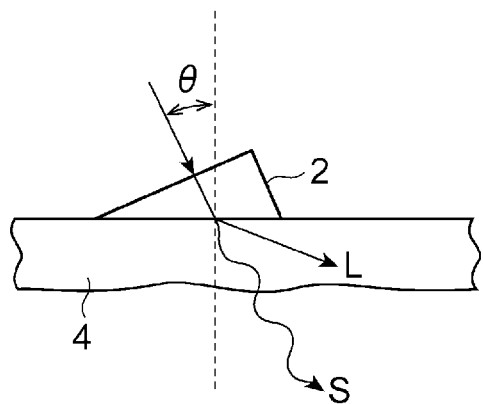
FIGS. 2A, 2B, and 2C are diagrams for explaining waves generated due to a difference in an incident angle θ of ultrasonic waves.
Figure 2B:
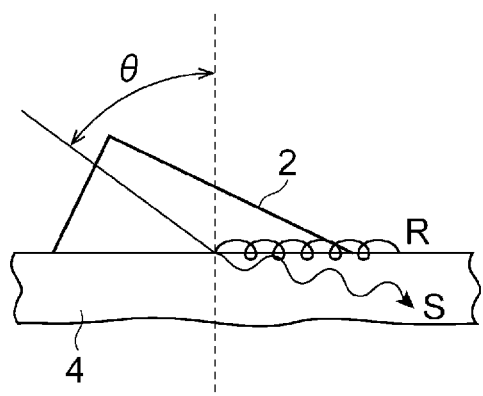
Figure 2C:
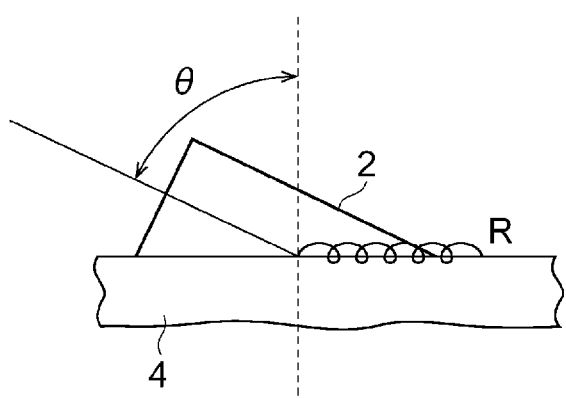
Figure 3:
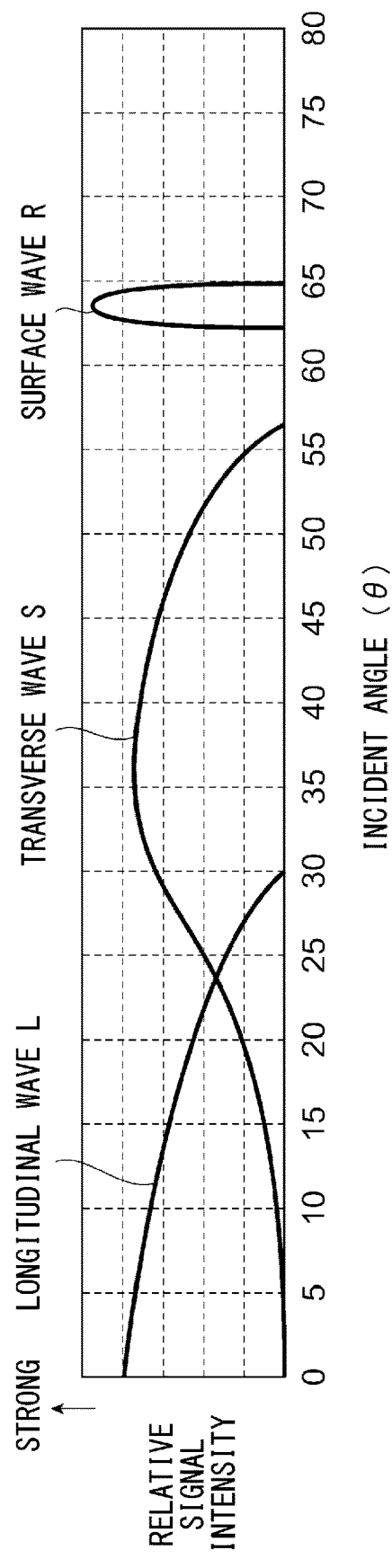
FIG. 3 is a diagram for explaining relative signal intensity of each wave of a longitudinal wave, a transverse wave, and a surface wave generated due to the difference in the incident angle θ of the ultrasonic waves.

To be specific, referring to FIG. 1, even when the f·d value is slightly larger than "4", the A0 mode is significantly excited as compared with the S0 mode and other modes due to the relation between the incident angle of the ultrasonic wave and the phase velocity. For example, it is preferable to design to be in a state where the f·d value is 0.5 to 4 (region Ar2 in FIG. 1). Since the A0 mode is significantly excited when there is a difference of a ratio equal to or higher than a certain value between the phase velocity of the asymmetric mode A0 mode and the phase velocity of the symmetric mode S0 mode, it is more preferably to design to be a f·d value where there is a difference of a ratio equal to or higher than a certain value between the phase velocity of the A0 mode and the phase velocity of the S0 mode. For example, it is preferable to design such that the f·d value is 0.5 to 3. In addition, the greater the f·d value is, the higher order mode is excited. When the f·d value is equal to or less than a predetermined value, only the asymmetric mode A0 mode, which is the lowest order mode, is excited. Therefore, it is preferable to design such that the f·d value is equal to or less than a predetermined value. On the other hand, when the f·d value is small, the difference in the phase velocity due to the difference in the f·d value becomes large. Therefore, it is preferable that the f·d value is equal to or greater than a predetermined value. For example, it is preferable to design such that the f·d value is 1 to 3.

For the asymmetric mode A0 mode, there is a region of the f·d value where the phase velocity is lower not only than that of other modes but also than that of a longitudinal wave, a transverse wave, and a surface wave. Therefore, it is possible to only substantially excite the asymmetric mode A0 mode by making the incident angle θ larger than a critical angle of the surface wave R in the pipe wall of the piping P.

Figure 8:
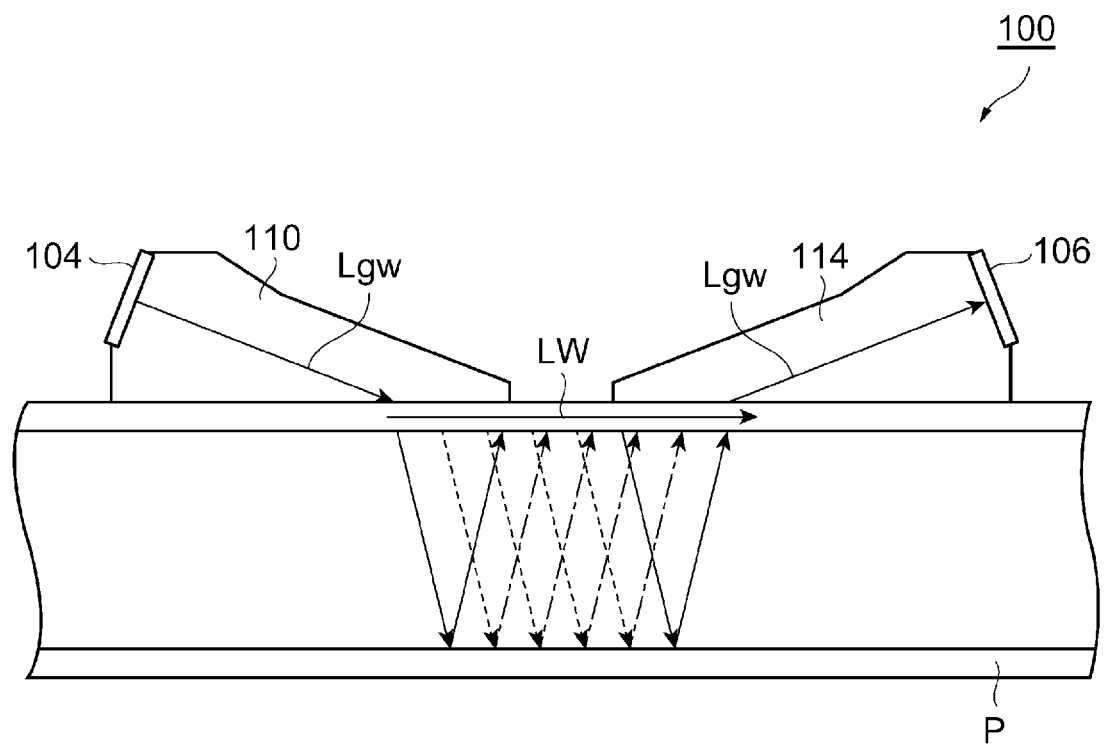
FIG. 8 is a diagram for explaining a mode of ultrasonic vibration generated in a piping material and a gas flowing in the piping.

Referring to FIG. 8, the first and second wedge members 110 and 114 propagate longitudinal waves Lgw as ultrasonic signals. The first and second wedge members 110 and 114, and the Lamb waves LW in the broad sense of the asymmetric mode A0 mode in the pipe wall of the piping P are subjected to mode conversion in the outer wall of the piping P, and the longitudinal waves and the Lamb waves propagate as ultrasonic signals.

The phase velocities of the longitudinal waves Lgw propagating in the first and second wedge members 110 and 114 differ depending on the materials of the first and second wedge members 110 and 114. As the materials of the first and second wedge members 110 and 114, resins such as polyphenylsulfone (PPSU) and polyphenylene sulfide (PPS) are selected.

The longitudinal waves Lgw propagating in the first and second wedge members 110 and 114 generate signals having different phase velocities due to the incident angle θ. The smaller the incident angle θ, the higher of the phase velocity a signal is generated; the larger the incident angle θ, the lower of the phase velocity a signal is generated. As the incident angle θ approaches 90°, the phase velocity of the generated signal gets closer to the sonic velocity of the longitudinal waves Lgw propagating in the first and second wedge members 110 and 114. As the incident angle θ approaches 0°, that is, as the incident angle θ gets farther from 90°, the phase velocity of the generated signal becomes higher than the sonic velocity of the longitudinal waves Lgw propagating in the first and second wedge members 110 and 114.

When selecting the material of the first and second wedge members 110 and 114, it is good to select a material such that the sonic velocity of the longitudinal waves Lgw propagating in the first and second wedge members 110 and 114 becomes lower than the phase velocity of the Lamb wave of a signal to be excited. Since the sonic velocity of the longitudinal wave Lgw propagating in polyphenylsulfone (PPSU) is lower than the sonic velocity of the longitudinal wave Lgw propagating in polyphenylene sulfide (PPS), it is suitable for exciting the Lamb wave LW in the broad sense of the asymmetric mode AO mode with a low phase velocity.

When the phase velocity of a signal generated by the longitudinal waves Lgw incident at the incident angle θ and propagating in the first and second wedge members 110 and 114 is consistent with the phase velocity of the Lamb wave LW of the asymmetric mode AO mode in the pipe wall of the piping P, the Lamb wave LW of the AO mode having strong signal intensity is excited. The greater the phase velocity of the signal generated by the longitudinal wave Lgw differs from the phase velocity of the Lamb wave LW of the AO mode in the pipe wall of the piping P, the weaker the signal intensity of the excited Lamb wave LW of the AO mode. A longitudinal wave propagates as an ultrasonic signal. The Lamb waves LW of the AO mode in the first and second wedge members 110 and 114 and in the pipe wall of the piping P are mutually excited in the outer wall of the piping P, and the longitudinal waves and the Lamb waves propagate as ultrasonic signals.

The material of the pipe wall of the piping P which is the object, the thickness of the pipe wall (pipe wall thickness) d, the frequency f of an ultrasonic signal of the ultrasonic flowmeter, and the phase velocity Cp (phase velocity of the Lamb wave) of an ultrasonic wave propagating in the pipe wall based on the mode of the excited Lamb wave LW in the broad sense are determined as described above. When the material of the pipe wall of the piping P which is the object is determined, the phase velocities of each mode of the Lamb waves for the f·d value, which is the product of the pipe wall thickness of the piping P and a frequency of an ultrasonic signal, are substantially determined.

For example, referring to FIG. 1, in the asymmetric mode AO mode, the phase velocity is about 2800 m/s when the f·d value is 2.5, and the incident angle θ can be designed by the sonic velocity of the longitudinal wave propagating in the first and second wedge members 110 and 114, and the phase velocity determined based on the f·d value of an assumed mode which is the object. Here, in a case of a clamp-on type ultrasonic flowmeter, the thickness of the pipe wall (pipe wall thickness) d may vary depending on the piping P which is the object, and the frequency f of the ultrasonic signal of the ultrasonic flowmeter may also vary depending on the design. However, the material and the incident angle θ of the first and second wedge members 110 and 114 may be fixed.

In a case where the material and the incident angle θ of the first and second wedge members 110 and 114 are fixed while the frequency f of the ultrasonic signal of the ultrasonic flowmeter is variable, a frequency f of an ultrasonic signal where the phase velocity Cp of the excited Lamb wave is consistent with a phase velocity of a signal forcibly vibrated by the longitudinal wave Lgw propagating in the first and second wedge members 110 and 114 is selected. It may also be configured to select a frequency f of an ultrasonic signal where the phase velocity Cp of the excited Lamb wave and the phase velocity of the signal forcibly vibrated by the longitudinal wave Lgw propagating in the first and second wedge members 110 and 114 become closest to each other. The frequency f of the ultrasonic signal is selected based on phase velocity characteristic information indicating a correspondence relation between the frequency f of the ultrasonic signal, the thickness of the pipe wall (pipe wall thickness) d and the phase velocity CP of the Lamb wave, and the thickness of the pipe wall (pipe wall thickness) d set based on a user's designation.

In a case where the material and the incident angle θ of the first and second wedge members 110 and 114 are fixed and the frequency f of the ultrasonic signal of the ultrasonic flowmeter is also fixed, since the material and the incident angle θ of the first and second wedge members 110 and 114 are fixed, the phase velocity of a signal forcibly vibrated by the longitudinal wave Lgw propagating in the first and second wedge members 110 and 114 is determined without depending on the frequency f of the ultrasonic signal of the ultrasonic flowmeter and the thickness of the pipe wall (pipe wall thickness) d. In contrast, the phase velocity Cp of the Lamb wave excited thereby is determined depending on the frequency f of the ultrasonic signal of the ultrasonic flowmeter and the thickness of the pipe wall (pipe wall thickness) d, and the two phase velocities are not necessarily consistent with each other.

Referring to FIG. 1, to describe specifically and illustratively, when the f·d value is, for example, 2 MHz·mm, the phase velocity Cp is 2700 m/s. When the phase velocity Cp, the sonic velocity Cf of an ultrasonic signal propagating in a gas, and the inner diameter D of the piping P are determined, the flow rate can be obtained based on the measured Δt. It is only necessary to let the user input information related to the sonic velocity Cf of the ultrasonic signal propagating in the gas and the inner diameter D of the piping P.

Figure 10:
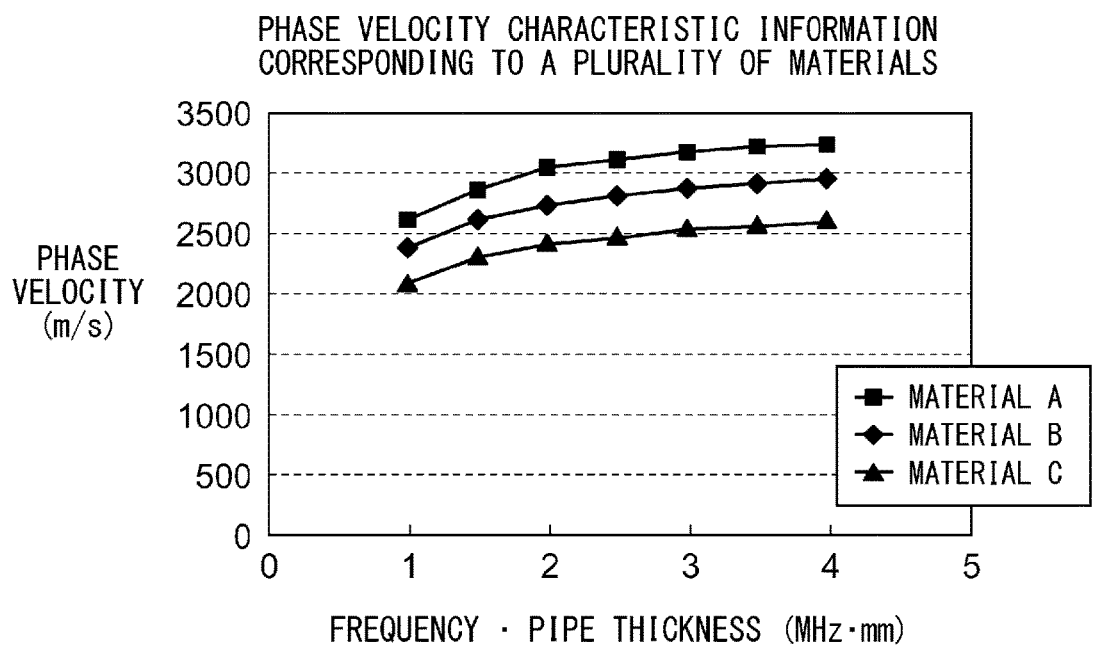
FIG. 10 is a diagram for explaining an example of phase velocity characteristic information preferably to be stored in a memory.
Figure 11:
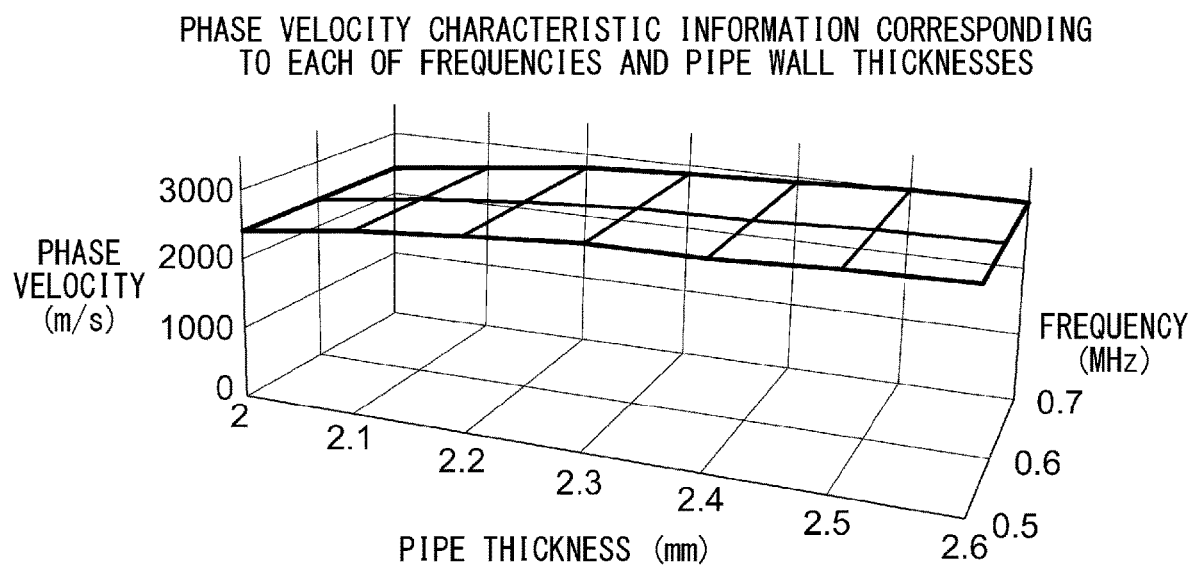
FIG. 11 is a diagram for explaining another example of phase velocity characteristic information preferably to be stored in a memory.

FIG. 8 shows an example of the phase velocity characteristic information required for the flow rate calculation. The phase velocity characteristic information may be a function of the phase velocity Cp of the Lamb wave excited utilizing the frequency f of the ultrasonic signal of the ultrasonic flowmeter and the thickness of the pipe wall (pipe wall thickness) d, and may also be a correspondence relation relating to the frequency f of the ultrasonic signal of the ultrasonic flowmeter and the thickness of the pipe wall (pipe wall thickness) d corresponding to the phase velocity Cp. For example, it may be a correspondence table including a plurality of different phase velocities corresponding to a product of a plurality of different frequencies f and the thickness of the pipe wall (pipe wall thickness) d. The phase velocity characteristic information is stored in advance in accordance with the frequency f of the ultrasonic signal corresponding to the ultrasonic flowmeter and the thickness of the pipe wall (pipe wall thickness) d. A correspondence table corresponding to a plurality of phase velocities Cp may be stored in advance in accordance with the frequency f of the corresponding ultrasonic signal and/or the thickness of the pipe wall (pipe wall thickness) d. A plurality of phase velocity information disclosed in FIG. 10 is corresponding to a plurality of materials of the piping P. FIG. 11 shows another example of phase velocity characteristic information corresponding to frequencies and thicknesses of the pipe walls of the piping. The phase velocity characteristic information can be defined from the characteristic lines of the asymmetric mode AO mode in FIG. 1.

Figure 12:
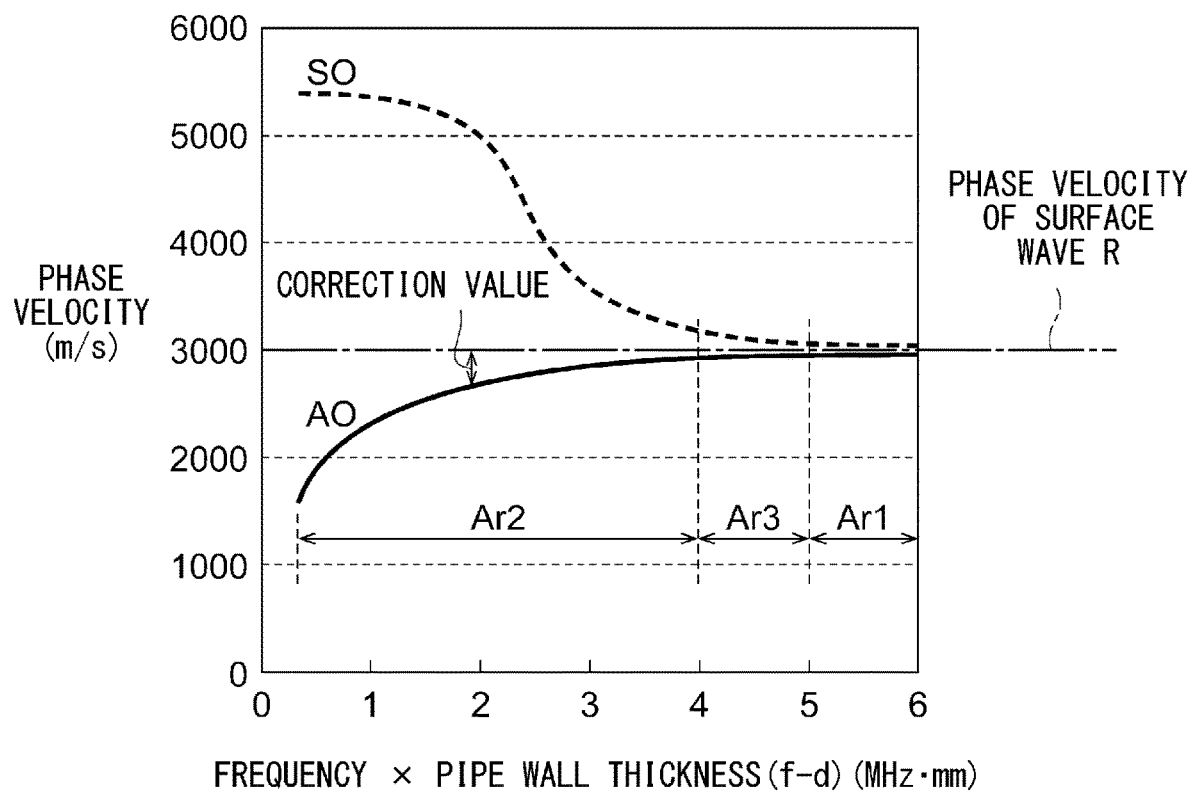
FIG. 12 is a diagram for explaining further another example of phase velocity characteristic information preferably to be stored in a memory.

As a variation, a constant phase velocity may be defined, and as shown in FIG. 12, a correction value corresponding to an individual frequency and an individual pipe wall thickness (f value and d value) may be used as the phase velocity characteristic information. Accordingly, the flow rate of a gas can be calculated by correcting an error due to a difference from a phase velocity set as a reference.

Figure 9:
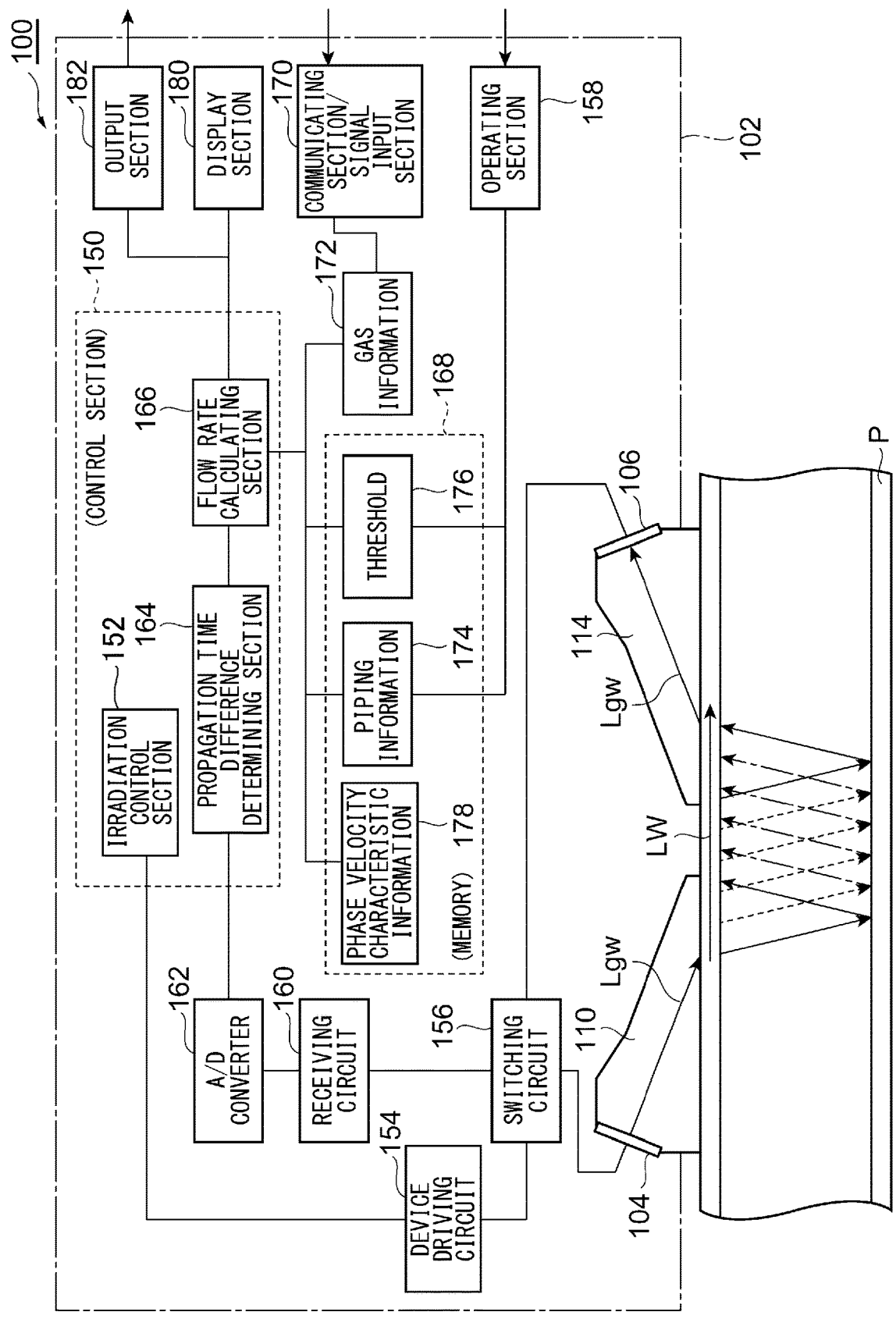
FIG. 9 is a functional block diagram of a flow sensor body.

FIG. 9 is a functional block diagram of the flow sensor body 102. The flow sensor body 102 includes a control section 150 which includes a CPU. The control section 150 includes an irradiation control section 152 which controls irradiation of the ultrasonic devices 104 and 106. A device driving circuit 154 is controlled by the irradiation control section 152, and an output from the device driving circuit 154 is sequentially supplied to the first and second ultrasonic devices 104 and 106 passing through a switching circuit 156. The switching circuit 156 is switched and controlled by the control section 150 in synchronization with the control by the irradiation control section 152.

Outputs from the ultrasonic devices 104 and 106 are supplied to a receiving circuit 160 passing through the switching circuit 156, and an analog signal received by the receiving circuit 160 is converted into a digital signal by an A/D converter 162 and is input to the control section 150. The control section 150 includes a propagation time difference determining section 164, and the flow rate of a gas flowing in the piping P is calculated in a flow rate calculating section 166 based on a propagation time difference Δt obtained by the propagation time difference determining section 164.

Information required for the calculation by the flow rate calculating section 166 is stored in a memory 168. Information including gas information 172 from the outside through a communicating section or a signal input section 170 is input to the memory 168. In this way, the sonic velocity Cf of an ultrasonic signal propagating in the gas to be measured is determined based on the information relating to the gas received from the outside, and then the flow rate of the gas can be calculated based on the determined sonic velocity Cf of the ultrasonic signal propagating in the gas to be measured.

The sonic velocity Cf in the gas may be determined from a previously stored value corresponding to the type of the gas received via an operating section, and may also be determined from a sonic velocity received via the operating section. In addition, the control section 150 may include a measuring section which measures the sonic velocity in the gas to be measured flowing in the piping P by obtaining a propagation time of an ultrasonic signal based on a received ultrasonic signal and further determining a propagation distance of the ultrasonic signal from parameters such as the inner diameter D.

Examples of the information stored in the memory 168 may include, in addition to information 174 relating to the piping, a threshold 176, etc., a correspondence relation between the frequency f of the ultrasonic signal, the thickness of the pipe wall (pipe wall thickness) d and the phase velocity of the Lamb wave. This correspondence relation, that is, the relation described with reference to FIG. 10, is stored as the phase velocity characteristic information in the memory 168. The flow rate of the gas can be calculated based on the phase velocity characteristic information stored in the memory 168.

The phase velocity characteristic information 178 differs depending on the material of the pipe wall of the piping P, and thus it is preferably to store the phase velocity characteristic information corresponding to each material described with reference to FIG. 11 in the memory 168. The flow rate of the gas can be calculated based on the phase velocity characteristic information.

Here, description will be made to the use of the phase velocity characteristic information in calculating the flow rate in the ultrasonic flowmeter. In order to determine a propagation time difference, transmission and reception of ultrasonic signals are performed in each of an outward path transmitting state in which the first ultrasonic device 104 is used as a transmitter and the second ultrasonic device 106 is used as a receiver, and a return path transmitting state in which the second ultrasonic device 106 is used as a transmitter and the first ultrasonic device 104 is used as a receiver. Then, based on each of the received ultrasonic signals, a propagation time difference Δt is determined at the electric wave time difference determining section 164, and the flow rate of the gas to be measured is calculated at the flow rate calculating section 166 based on the determined propagation time difference Δt.

To specifically describe the receiving circuit 160, etc., an ultrasonic signal emitted from the first ultrasonic device 104 or the second ultrasonic device 106 on the transmission side is received by the other ultrasonic device 104 or 106 on the reception side, and the received ultrasonic signal is sent as an electrical signal to the receiving circuit 160. The receiving circuit 160 amplifies the electrical signal and the amplified electrical signal is sent to the A/D converter 162 connected to the receiving circuit. The A/D converter 162 converts the electrical signal equivalent to an ultrasonic signal into a digital signal. The ultrasonic signal is taken into the control section 150 as a digital waveform signal, and the propagation time difference Δt is determined at the propagation time difference determining section 164 based on an ultrasonic signal obtained in the outward path transmitting state and an ultrasonic signal obtained in the return path transmitting state.

In the outward path transmitting state, the switching circuit 156 connects the device driving circuit and the first ultrasonic device 104, and connects the second ultrasonic device 106 and the receiving circuit. In this way, the first ultrasonic device 104 functions as a transmitter and the second ultrasonic device 106 functions as a receiver in the outward path transmitting state.

Similarly, in the return path transmitting state, the switching circuit 156 connects the device driving circuit and the second ultrasonic device 106, and connects the first ultrasonic device 104 and the receiving circuit. In this way, the second ultrasonic device 106 functions as a transmitter and the first ultrasonic device 104 functions as a receiver in the return path transmitting state.

The irradiation control section 152 supplies an electrical signal corresponding to an ultrasonic signal to be transmitted to the device driving circuit 154, and the device driving circuit 154 drives the ultrasonic device 104 (or 106) as a transmitter connected by the switching circuit 156 and generates an ultrasonic signal by the ultrasonic device 104 (or 106). The ultrasonic signal generated by the ultrasonic device 104 (or 106) propagates through the wedge member 110 (or 114) as a longitudinal wave Lgw, and the mode is converted at the outer wall of the piping P and a Lamb wave Lw is excited as an ultrasonic signal. The Lamb wave Lw excited at the pipe wall of the piping P has a phase velocity Cp depending on the frequency f of the ultrasonic signal and the thickness of the pipe wall (pipe wall thickness) d. The Lamb wave excited at the pipe wall of the piping P has its mode converted at the inner wall of the piping P and propagates as an ultrasonic signal of a longitudinal wave in the gas to be measured. In this case, an emitted angle θf to the gas to be measured is an emitted angle at the time when an ultrasonic signal incident at an incident angle of 90° with a phase velocity (phase velocity of a Lamb wave) Cp of an ultrasonic wave propagating in the pipe wall is emitted with a sonic velocity (the sonic velocity of a longitudinal wave propagating in the gas) Cf of an ultrasonic wave propagating in the gas according to Snell's law. Here, since the phase velocity Cp of the ultrasonic wave propagating in the pipe wall is the phase velocity of the Lamb wave and depends on the frequency f of the ultrasonic signal and the thickness of the pipe wall (pipe wall thickness) d as described above, the emitted angle θf to the gas to be measured also depends on the frequency f of the ultrasonic signal and the thickness of the pipe wall (pipe wall thickness) d. Referring to the mathematical expression 1, the flow rate is related with the propagation time difference Δt, the sonic velocity (the sonic velocity of a longitudinal wave propagating in the gas) Cf of an ultrasonic wave propagating in the gas, and the emitted angle θf, and the emitted angle θf depends on the frequency f of the ultrasonic signal and the thickness of the pipe wall (pipe wall thickness) d. Therefore, the calculated flow rate also depends on the frequency f of the ultrasonic signal and the thickness of the pipe wall thickness d.

As the piping information 174, parameters such as the material of the piping, the pipe wall thickness d, and the inner diameter D are determined via the operating section. The determined parameters are stored in the memory 168 as the piping information. A frequency of an ultrasonic signal controlled by the irradiation control section may be used as the frequency f of the ultrasonic signal, or a frequency of a received ultrasonic signal may be measured as the frequency f of the ultrasonic signal. In this way, the frequency f of the ultrasonic signal and the pipe wall thickness d are determined, and the pipe wall phase velocity Cp corresponding to the determined frequency f of the ultrasonic signal and the pipe wall thickness d is determined based on the correspondence relation between the frequency f of the ultrasonic signal, the thickness of the pipe wall (pipe wall thickness) d and the phase velocity of the Lamb wave stored in the memory 168 as the phase velocity characteristic information. The flow rate is calculated based on the determined pipe wall phase velocity Cp.

In short, since a specific Lamb wave is significantly excited while other modes having an influence are not significantly excited, it is possible to selectively obtain a specific Lamb wave mode even if there is no distance between the ultrasonic devices. Moreover, since the flow rate is calculated based on the phase velocity characteristic information corresponding to that specific Lamb wave, the flow rate measurement accuracy can be maintained at a high level.

The calculated flow rate may be an instantaneous flow rate or an integrated flow rate. In addition, it is also fine to, based on a threshold received via the operating section, compare the flow rate and the threshold and generate an on-off signal corresponding to the comparison result.

The flow rate calculated by the flow rate calculating section 166 is numerically displayed on a display section 180 and is output from an output section 182 as an analog signal or a pulse signal. The generated on-off signal is displayed lighted up on the display section 180 and is output from the output section 182 as an on-off signal.

As to the correction incorporated in the operational expression for obtaining the flow rate·flow velocity of the gas, it is preferable to add a pressure correction and a temperature correction for converting to a normal flow rate following Boyle-Charles' law. The flowmeter 100 obtains a volume flow rate by calculation. The volume flow rate takes different values as the pressure and temperature of the environment differ. It is possible to provide a meaning of an absolute value for the user by converting to a normal flow rate per hour converted to 0° C., 1 atmosphere (1 atm).

As to the pressure correction, when the pressure of the gas to be measured flowing in the piping P is constant during measurement, a pressure value used for the correction is preferably a constant value. In this case, a pressure setting section may accept a user operation by the operating section and set a fixed pressure value to be used for correction based on the setting input received by the operating section 158.

When a pressure gauge which measures the pressure of the gas to be measured flowing in the piping P and outputs an analog signal corresponding to the measured pressure value is prepared, the pressure setting section may accept the analog signal from the pressure gauge by the signal input section and determine a pressure value used for correction based on the analog signal received by the signal input section 170.

As to the temperature correction, the ultrasonic flowmeter 100 may include a temperature measuring device for estimating the temperature of the gas to be measured flowing in the piping P. In this case, the temperature of the piping is measured and the temperature of the gas to be measured flowing in the piping P is estimated. Further, it is also fine to obtain a sonic velocity in the gas to be measured flowing in the piping P from the propagation time of an ultrasonic signal and the propagation distance of the ultrasonic signal and then estimate the temperature of the gas to be measured flowing in the piping P according to temperature dependence of a sonic velocity. When the temperature of the gas to be measured flowing in the piping P is constant during measurement, it is preferable that the temperature value used for correction is a constant value. In this case, a temperature setting section may accept a user operation by the operating section and set a fixed temperature value used for the correction based on the setting input received by the operating section.

When a thermometer which measures the temperature of the gas to be measured flowing in the piping P and outputs an analog signal corresponding to the measured temperature value is prepared, the temperature setting section may accept the analog signal from the thermometer by the signal input section 170 and determine a temperature value used for correction based on the analog signal received by the signal input section.

Embodiments of the invention have been described above. However, the invention is not limited thereto and may include the following variations.

(1) The invention can be applied to a Z-shape arrangement flowmeter. That is, the first ultrasonic device 104 and the second ultrasonic device 106 may be arranged opposing each other sandwiching the piping P. To be specific, the invention is suitably applicable to a flowmeter in which the first ultrasonic device 104 is arranged on the first mother line of the piping P and the second ultrasonic device 106 is arranged on the second mother line which opposes the first mother line in a diameter direction.

(2) The clamp-on type ultrasonic flowmeter 100 may include a display device for displaying a measured flow rate, for example, an instantaneous flow rate or an integrated flow rate. Further, a threshold setting unit which receives a setting input for setting a threshold and sets a threshold corresponding to the setting input may be provided, and the clamp-on type ultrasonic flowmeter 100 may include an output section which outputs an on-off signal based on a comparison result between a measured flow rate and the set threshold. In addition, it may include a display light which displays the on-off signal. The flow rate to be compared with the threshold may be an instantaneous flow rate or an integrated flow rate.

(3) The clamp-on type ultrasonic flowmeter 100 may include a signal intensity detecting section which detects the intensity of an ultrasonic signal and the intensity of a stray signal. It is fine to display information relating to a proper installation state of an ultrasonic transmitting section on a display device related to the clamp-on type ultrasonic flowmeter 100 based on the intensity of an ultrasonic signal detected by the signal intensity detecting section, and to display information relating to a proper installation state of the damping member on the display device based on a ratio between the intensity of the ultrasonic signal and the intensity of the stray signal detected by the signal intensity detecting section. By displaying information relating to a proper installation state of the damping member on the display device of the clamp-on type ultrasonic flowmeter, it is possible to prompt a proper installation of the damping member, or to prompt a readjustment of a fastener and a reattachment of the damping member, etc.

(4) In the clamp-on type ultrasonic flowmeter 100 of a V-shape arrangement or a reflection arrangement, the first and second ultrasonic devices 104 and 106 are incorporated in one flow sensor body 102 in the embodiment of the invention. However, the flow sensor body 102 may be divided into two and the first and second ultrasonic devices 104 and 106 may be respectively incorporated in the independent sensor bodies.

(5) In the embodiment, the first and second ultrasonic devices 104 and 106 are fixedly incorporated in one flow sensor body 102. However, the distance between the first and second ultrasonic devices 104 and 106 incorporated in the flow sensor body 102 may be adjustable in the axial direction Ax of the piping P.

What is claimed is:

1. A clamp-on type ultrasonic flowmeter which is detachably attached to an outer wall of cylindrical piping and measures a flow rate of a gas in the piping, the clamp-on type ultrasonic flowmeter comprising:
    an ultrasonic transmitting and receiving section including a first ultrasonic device and a second ultrasonic device each configured to transmit an ultrasonic signal to the piping to generate a plate wave corresponding to the ultrasonic signal on a wall of the piping, and receive, via a gas in the piping, an ultrasonic signal corresponding to the plate wave transmitted from the other of the first ultrasonic device and the second ultrasonic device; and
    a flow rate calculating section which calculates a flow rate of a gas in the piping based on a propagation time difference of the ultrasonic signals respectively received, via the gas in the piping, by each of the first ultrasonic device and the second ultrasonic device of the ultrasonic transmitting and receiving section;
    wherein a pipe wall thickness of the piping and a frequency of the ultrasonic signal are in a state in which a plate wave of a low order asymmetric mode is significantly excited on the wall of the piping; and
    the flow rate calculating section calculates the flow rate of the gas based on the propagation time difference of the ultrasonic signals each propagating via the gas in the piping along a path having an in-fluid angle corresponding to phase velocity characteristics of the low order asymmetric mode.

2. The clamp-on type ultrasonic flowmeter according to claim 1, wherein the phase velocity characteristics of the low order asymmetric mode correspond to different phase velocities for different pipe wall thicknesses of the piping and frequencies of ultrasonic signals, and the in-fluid angle corresponds to a phase velocity determined from a plurality of phase velocities based on the phase velocity characteristics of the low order asymmetric mode.

3. The clamp-on type ultrasonic flowmeter according to claim 1, wherein the clamp-on type ultrasonic flowmeter further includes a storing section which stores phase velocity characteristic information representing the phase velocity characteristics of the low order asymmetric mode, and
    the in-fluid angle is based on the phase velocity characteristic information stored in the storing section.

4. The clamp-on type ultrasonic flowmeter according to claim 3, further comprising:
    a receiving section which receives a selection of a piping material, wherein
    the storing section stores the phase velocity characteristic information corresponding to a plurality of piping materials, and
    the flow rate calculating section calculates the flow rate of the gas based on the phase velocity characteristic information stored in the storing section in correspondence to the selection of a piping material received by the receiving section.

5. The clamp-on type ultrasonic flowmeter according to claim 4, wherein the storing section stores a correspondence relation between the pipe wall thickness of the piping, a frequency of an ultrasonic signal, and the phase velocity of the low order asymmetric mode.

6. The clamp-on type ultrasonic flowmeter according to claim 4, further comprising:
    a receiving section which receives information for determining an inner diameter of piping and a pipe thickness of the piping.

7. The clamp-on type ultrasonic flowmeter according to claim 6, wherein the receiving section receives information relating to an outer shape of piping and a standard of the piping as information for determining an inner diameter of the piping and a pipe wall thickness of the piping, and determines the inner diameter of the piping and the pipe wall thickness of the piping based on the received information relating to the outer shape of the piping and the standard of the piping.

8. The clamp-on type ultrasonic flowmeter according to claim 3, wherein the storing section stores a correspondence relation between the phase velocity of the low order asymmetric mode and a product of the pipe wall thickness of the piping and a frequency of an ultrasonic signal.

9. The clamp-on type ultrasonic flowmeter according to claim 1, wherein the flow rate calculating section calculates the flow rate of the gas by correcting an error due to a difference in phase velocities based on the phase velocity characteristic information.

10. The clamp-on type ultrasonic flowmeter according to claim 1, further comprising:
    a receiving section which receives information relating to a gas to be measured, wherein
    the flow rate calculation section determines a phase velocity of an ultrasonic signal propagating in the gas to be measured based on the information relating to the gas received by the receiving section, and
    the flow rate calculating section calculates a flow rate of the gas based on the determined phase velocity of the ultrasonic signal propagating in the gas to be measured.

11. The clamp-on type ultrasonic flowmeter according to claim 1, further comprising:
a measuring section which measures a phase velocity of an ultrasonic signal propagating in a gas to be measured, and wherein
the flow rate calculating section calculates a flow rate of the gas based on the measured phase velocity of the ultrasonic signal propagating in the gas to be measured.

* * * * *